(12) United States Patent
Ryu et al.

(10) Patent No.: US 12,159,619 B2
(45) Date of Patent: Dec. 3, 2024

(54) ELECTRONIC DEVICE INCLUDING PERSONALIZED TEXT TO SPEECH MODULE AND METHOD FOR CONTROLLING THE SAME

(71) Applicant: SAMSUNG ELECTRONICS CO., LTD., Suwon-si (KR)

(72) Inventors: Cheol Ryu, Suwon-si (KR); Kwanghoon Kim, Suwon-si (KR); Junesig Sung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 17/654,881

(22) Filed: Mar. 15, 2022

(65) Prior Publication Data

US 2022/0301544 A1   Sep. 22, 2022

Related U.S. Application Data

(63) Continuation of application No. PCT/KR2022/003172, filed on Mar. 7, 2022.

(30) Foreign Application Priority Data

Mar. 19, 2021   (KR) .................. 10-2021-0036226

(51) Int. Cl.
  *G10L 15/22*      (2006.01)
  *G10L 13/04*      (2013.01)
  (Continued)

(52) U.S. Cl.
  CPC ............. *G10L 13/08* (2013.01); *G10L 13/04* (2013.01); *G10L 15/187* (2013.01); *G10L 15/22* (2013.01); *G10L 15/30* (2013.01)

(58) Field of Classification Search
  CPC ....... G10L 13/08; G10L 13/04; G10L 15/187; G10L 15/22; G10L 15/30
  (Continued)

(56) References Cited

U.S. PATENT DOCUMENTS

2006/0206326 A1   9/2006   Fukada
2009/0292528 A1   11/2009  Kameyama
(Continued)

FOREIGN PATENT DOCUMENTS

JP   2002-132292   5/2002
JP   2006-251147   9/2006
(Continued)

OTHER PUBLICATIONS

K.N., R. V., S. S. S. and D. R., "Intelligent Personal Assistant—Implementing Voice Commands enabling Speech Recognition," 2020 International Conference on System, Computation, Automation and Networking (ICSCAN), Pondicherry, India, 2020, pp. 1-5, doi: 10.1109/ICSCAN49426 .2020.9262279. keywords: { (Year: 2020).*

(Continued)

*Primary Examiner* — Bharatkumar S Shah
(74) *Attorney, Agent, or Firm* — Nixon & Vanderhye P.C.

(57) ABSTRACT

According to an embodiment, an electronic device comprises: a memory and at least one processor operatively connected with the memory. The at least one processor is configured to: in response to a voice assistant application being executed, identify a pronunciation variant for which an amount of sound source data stored in the memory is less than a specified value among a plurality of pronunciation variants, identify a subject based on the identified pronunciation variant, obtain a question text corresponding to a word including the identified pronunciation variant among a plurality of words included in the subject, output a question (Continued)

speech corresponding to the question text, and receive an utterance after outputting the question speech.

20 Claims, 10 Drawing Sheets

(51) Int. Cl.
    *G10L 13/08*     (2013.01)
    *G10L 15/187*     (2013.01)
    *G10L 15/30*     (2013.01)
(58) Field of Classification Search
    USPC .......................................................... 704/232
    See application file for complete search history.

(56) References Cited

U.S. PATENT DOCUMENTS

| | | |
|---|---|---|
| 2011/0165912 A1 | 7/2011 | Wang et al. |
| 2013/0325477 A1 | 12/2013 | Mitsui et al. |
| 2016/0284345 A1* | 9/2016 | Ji .............................. G06F 16/61 |
| 2017/0178619 A1 | 6/2017 | Naik et al. |
| 2018/0254034 A1 | 9/2018 | Li |
| 2019/0206389 A1 | 7/2019 | Kwon et al. |
| 2020/0013388 A1* | 1/2020 | Lee .......................... G10L 13/02 |
| 2020/0135213 A1 | 4/2020 | Kim et al. |
| 2022/0180867 A1* | 6/2022 | Bobbili ................... G10L 15/22 |

FOREIGN PATENT DOCUMENTS

| | | |
|---|---|---|
| JP | 2007-041319 | 2/2007 |
| JP | 2009-282704 | 12/2009 |
| JP | 2014-102345 | 6/2014 |
| KR | 10-2006-0107671 | 10/2006 |
| KR | 10-2012-0117041 | 10/2012 |
| KR | 10-2015-0052600 | 5/2015 |
| KR | 10-1590724 | 2/2016 |
| KR | 10-2019-0081248 | 7/2019 |
| KR | 10-2020-0048201 | 5/2020 |

OTHER PUBLICATIONS

Search Report and Written Opinion issued Jun. 20, 2022 in counterpart International Patent Application No. PCT/KR2022/003172.
Extended European Search Report dated Feb. 2, 2024 issued in European Patent Application No. 22771660.2.
European Examination Report dated Oct. 8, 2024 for EP Application No. 22771660.2.
Korean Office Action dated Oct. 16, 2024 for KR Application No. 10-2021-0036226.

* cited by examiner

| Question | What's your hobby? |
|---|---|
| Answer 1 | I like listening to the music<br>I liked TVXQ songs,<br>but they are inactive these days,<br>I am more interested in other boy bands,<br>especially BTS. |
| Answer 2 | A rumor has it that LEE Sedol who<br>was not interested in girl bands was into Ohmygirl.<br>Jinkyung PD is also a fan of Ohmygirl.<br>I loves Ohmygirl's Dolphin. |
| . . | . . |

FIG.7A

| Pronunciations | Amount of data |
|---|---|
| A | 120% |
| B | 110% |
| C | 115% |
| D | 95% |
| E | 110% |
| F | 65% |
| G | 85% |

FIG.7B

| Subjects | Words |
|---|---|
| K - POP | BTS, BlackPink, SM, JYP |
| History | Joseon, King, Silla, Japan, Gyeongju |
| Real estate | Apartment, Seoul, office, loan |
| ... | ... |

FIG.8A

| Question | What's your hobby? |
|---|---|
| Answer 1 | I like listening to the music<br>I liked TVXQ songs,<br>but they are inactive these days,<br>I am more interested in other boy bands,<br>especially BTS. |
| Subject prediction | K - POP : 72%<br>History : 13%<br>Real estate : 0% |

FIG.8B

| Words | Pronunciations |
|---|---|
| BTS | B, T, S |
| Tesla | T, e, s, l, a |
| Meat | M, e, a, t |
| Cave | C, a, v, e |

FIG.9A

| Pronunciations | Words |
|---|---|
| G | Glory, Game |
| K | Kite, K-Pop, Korea |
| B | Bangtan, BTS, Berry |
| T | Bangtan, BTS, Tesla |

FIG.9B

| Words | Pronunciations |
|---|---|
| BTS | Which BTS member is your favorite?<br>First Korean singer ranked top on Billboard? |
| Bread | What bread is best in the bakery? |
| Galaxy | What brand's phone do you use? |
| ... | ... |

FIG.10

ELECTRONIC DEVICE INCLUDING PERSONALIZED TEXT TO SPEECH MODULE AND METHOD FOR CONTROLLING THE SAME

CROSS-REFERENCE TO RELATED APPLICATIONS

This application is a national stage of International Application No. PCT/KR2022/003172 designating the United States, filed on Mar. 7, 2022, in the Korean Intellectual Property Receiving Office and claiming priority to Korean Patent Application No. 10-2021-0036226, filed on Mar. 19, 2021, in the Korean Intellectual Property Office, the disclosures of which are incorporate by reference herein in their entireties.

BACKGROUND

Field

The disclosure relates to an electronic device including a personalized text-to-speech (TTS) module and a method for controlling the electronic device.

Description of Related Art

There are recently being provided various services using an artificial intelligence agent (e.g., Bixby™, Assistant™, or Alexa™) that provides responses to user speech inputs. Text-to-speech (TTS) technology enables more natural synthesized sounds by comprehensively modeling the relationship between input text and acoustic characteristics.

TTS may refer, for example, to a technology that creates a speech most appropriate for any given text by learning data pairs of text and sound source. Personalized TTS (P-TTS) may refer, for example, to a technology that converts an acoustic model into the user's tone and aims to mimic the user's voice by obtaining a few text-sound source data pairs from the user and generating massive text-sound source data pairs based on the obtained text-sound source data pairs.

For personalized TTS to generate massive sound sources, all pronunciation variants need to be included in the few text-sound source data pairs. To that end, the electronic device previously provides text including all pronunciation variants to the user and allows the user to read the text, thereby securing sound sources.

The performance of personalized TTS depends primarily on whether the gathered sounds are as natural as the user speaks as usual and secondarily on whether sufficient sounds are gathered for each pronunciation variant.

However, the way of obtaining sounds by letting the user read text would not lead to a natural speech from the user as if she has a conversation.

SUMMARY

Embodiments of the disclosure provide an electronic device for obtaining a natural speech from the user via a conversation using a chat-bot and a method for controlling the same.

According to an example embodiment, an electronic device comprises: a memory and at least one processor operatively connected with the memory. The at least one processor is configured to: in response to a voice assistant application being executed, identify a pronunciation variant for which an amount of sound source data stored in the memory is less than a specified value among a plurality of pronunciation variants, identify a subject based on the identified pronunciation variant, obtain a question text corresponding to a word including the identified pronunciation variant among a plurality of words included in the subject, output a question speech corresponding to the question text, and receive an utterance after outputting the question speech.

According to an example embodiment, a method of controlling an electronic device comprises, in response to a voice assistant application being executed: identifying a pronunciation variant for which an amount of sound source data stored in a memory is less than a specified value among a plurality of pronunciation variants, identifying a subject based on the identified pronunciation variant, obtaining a question text corresponding to a word including the identified pronunciation variant among a plurality of words included in the subject, outputting a question speech corresponding to the question text, and receiving an utterance after outputting the question speech.

According to various example embodiments, since the user's utterances are gathered through a conversation with a chat-bot, it is possible to obtain natural utterances from the user, thereby enhancing the quality of personalized TTS.

According to various example embodiments, it is possible to address an imbalance in the amount of sound sources to be used for personalized TTS.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7A is a chart illustrating answer data gathered by a user's utterance according to various embodiments;

FIG. 7B is a chart illustrating the amount of sound source data per pronunciation variant according to various embodiments;

FIG. 8A is a chart illustrating a word list for each subject according to various embodiments;

FIG. 8B is a chart illustrating a result of subject prediction by an electronic device according to various embodiments;

FIG. 9A is a chart illustrating per-word pronunciation variants according to various embodiments;

FIG. 9B is a chart illustrating per-pronunciation variant words according to various embodiments;

FIG. 10 is a chart illustrating a question list per word according to various embodiments.

DETAILED DESCRIPTION

Figure 1:
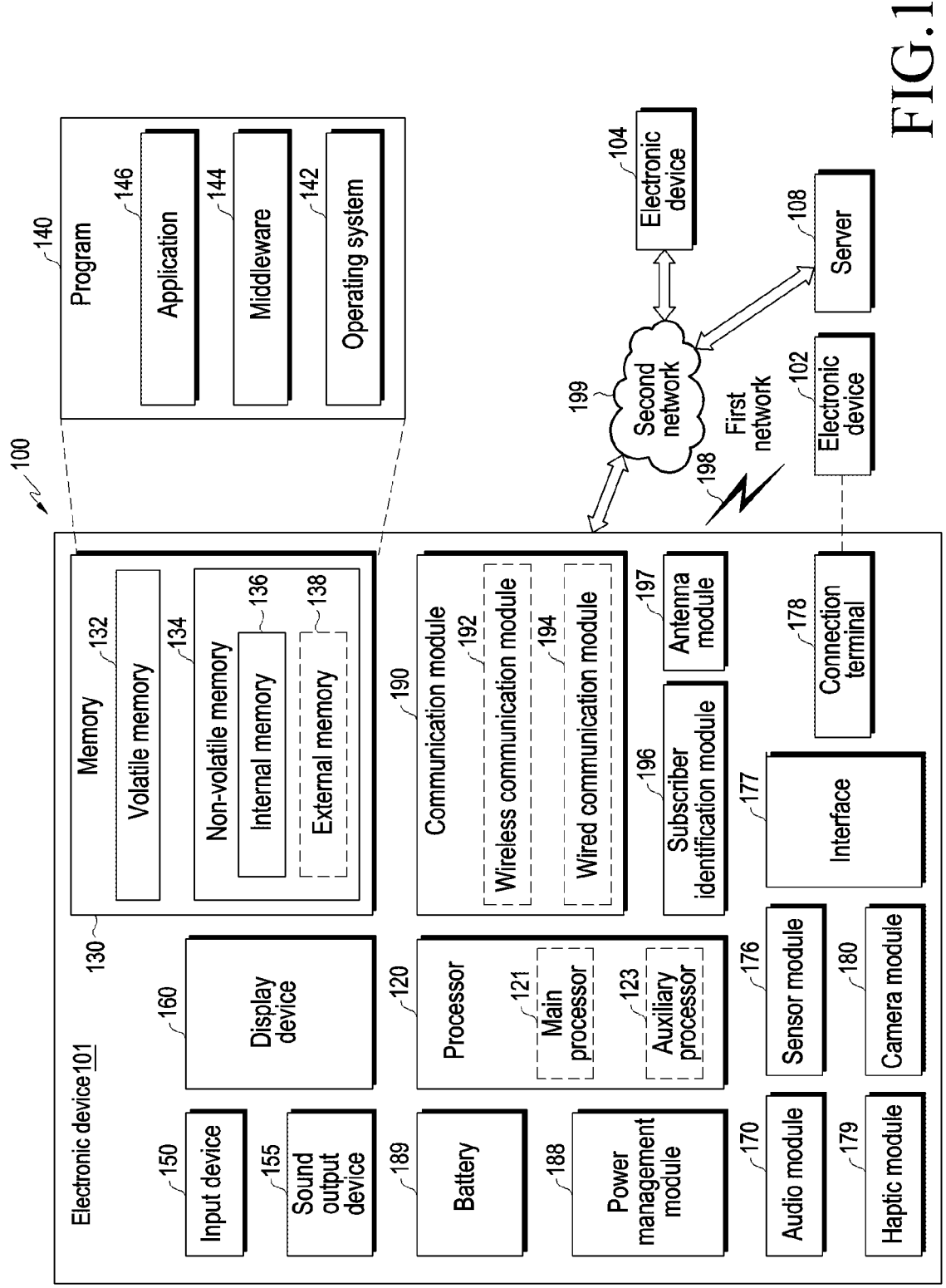
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligence server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
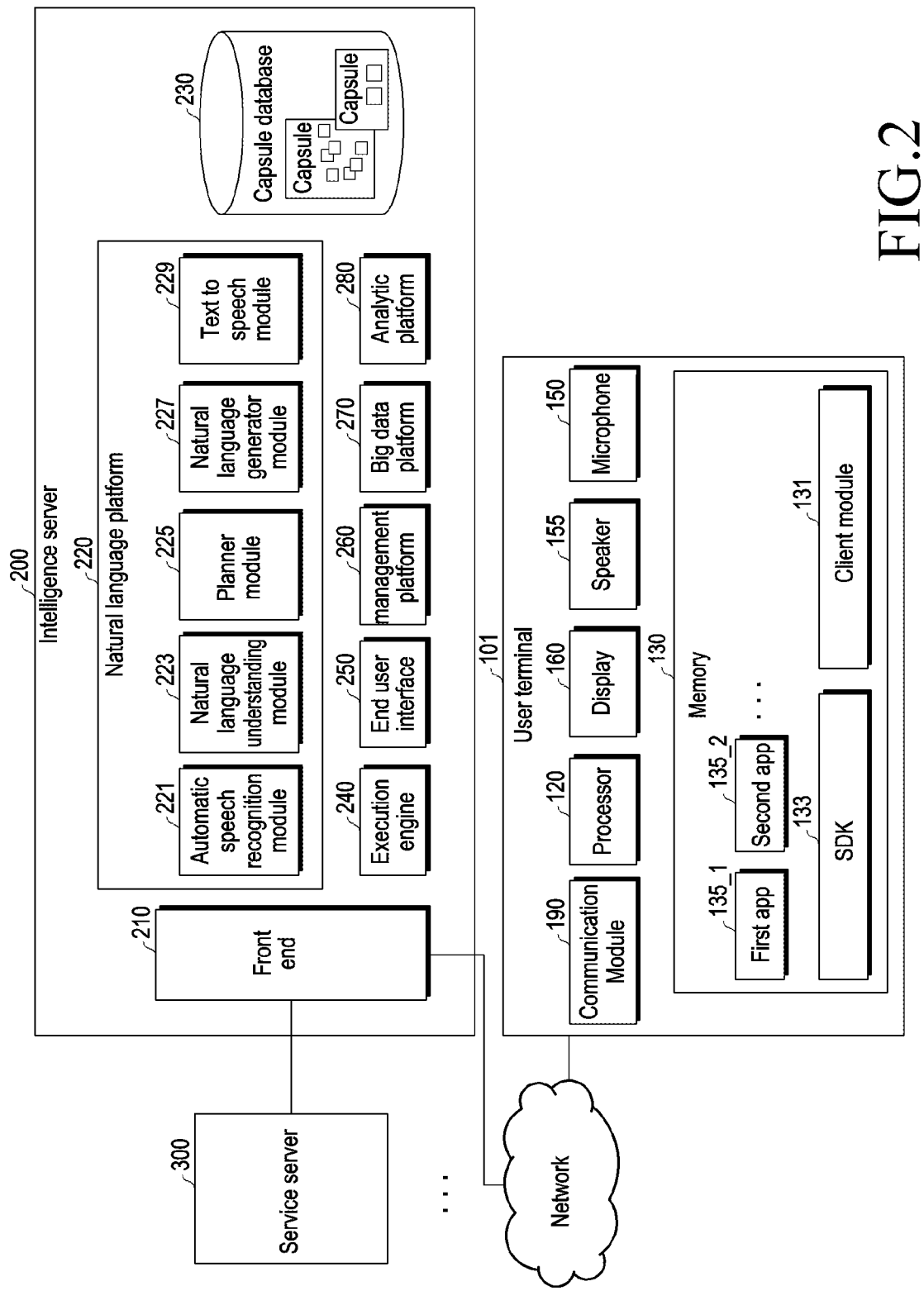
FIG. 2 is a block diagram illustrating an example integrated intelligence system according to various embodiments.

FIG. 2 is a block diagram illustrating an example integrated intelligence system according to various embodiments.

Referring to FIG. 2, according to an embodiment, an integrated intelligence system may include a user terminal 101, an intelligence server 200, and a service server 300.

According to an embodiment, the user terminal 101 (e.g., the electronic device 101 of FIG. 1) may be a terminal device (or electronic device) that may connect to the Internet, e.g., a mobile phone, smartphone, personal digital assistant (PDA), laptop computer, TV, home appliance, wearable device, head-mounted device (HMD), smart speaker, or the like, but is not limited thereto.

According to an embodiment, the user terminal 101 may include a communication module (e.g., including communication circuitry) 190, a microphone 150, a speaker 155, a display 160, a memory 130, and/or a processor (e.g., including processing circuitry) 120. The above-enumerated components may be operatively or electrically connected with each other.

According to an embodiment, the communication module 190 (e.g., the communication module 190 of FIG. 1) may include various communication circuitry and be configured to connect to an external device to transmit and receive data. According to an embodiment, the microphone 150 (e.g., the input module 150 of FIG. 1) may receive a sound (e.g., the user's utterance) and convert the sound into an electrical signal. According to an embodiment, the speaker 155 (e.g., the sound output module 155 of FIG. 1) may output an electrical signal as sound (e.g., speech). According to an embodiment, the display 160 (e.g., the display module 160 of FIG. 1) may be configured to display images or videos. According to an embodiment, the display 160 may display a graphic user interface (GUI) of an app (or application program) that is executed.

According to an embodiment, the memory 130 (e.g., the memory 130 of FIG. 1) may store various software (e.g., executable program instructions) including a client module 131, a software development kit (SDK) 133, and a plurality of apps 135 (e.g., 135-1, 135-2, etc.). The client module 131 and the SDK 133 may configure a framework (or solution program) for performing general-purpose functions. The client module 131 or SDK 133 may configure a framework for processing speech input.

According to an embodiment, the plurality of apps 135 stored in the memory 130 may be programs for performing designated functions. According to an embodiment, the plurality of apps 135 may include a first app 135-1 and a second app 135-3. According to an embodiment, each of the plurality of apps 135 may include a plurality of actions for performing the designated function. For example, the apps may include an alarm app, a messaging app, and/or a scheduler app. According to an embodiment, the plurality of apps 135 may be executed by the processor 120 (e.g., the processor 120 of FIG. 1) to sequentially execute at least some of the plurality of operations.

According to an embodiment, the processor 120 may include various processing circuitry and control the overall operation of the user terminal 101. For example, the processor 120 may be electrically connected with the communication module 190, microphone 150, speaker 155, and display 160 to perform designated operations.

According to an embodiment, the processor 120 may execute the program stored in the memory 130 to perform a designated function. For example, the processor 120 may execute at least one of the client module 131 or the SDK 133 to perform the following operations for processing speech input. The processor 120 may control the operation of the plurality of apps 135 via, e.g., the SDK 133. The following operations described as operations of the client module 131 or SDK 133 may be operations according to the execution of the processor 120.

According to an embodiment, the client module 131 may receive a speech input. For example, the client module 131 may receive a speech signal corresponding to the user's utterance detected via the microphone 150. The client module 131 may transmit the received speech input to the intelligence server 200 (e.g., the server 108 of FIG. 1). The client module 131 may transmit state information about the user terminal 101 along with the received speech input to the intelligence server 200. The state information may be, e.g., app execution state information.

According to an embodiment, the client module 131 may receive a result corresponding to the received speech input. For example, if the intelligence server 200 may produce the result corresponding to the received speech input, the client module 131 may receive the result corresponding to the received speech input. The client module 131 may display the received result on the display 160.

According to an embodiment, the client module 131 may receive a plan corresponding to the received speech input. The client module 131 may display the results of execution of the plurality of operations of the app according to the plan on the display 160. The client module 131 may sequentially display, e.g., the results of execution of the plurality of operations on the display. As another example, the user terminal 101 may display only some results of execution of the plurality of operations (e.g., the result of the last operation) on the display.

According to an embodiment, the client module 131 may receive a request for obtaining information necessary to produce the result corresponding to the speech input from the intelligence server 200. According to an embodiment, the client module 131 may transmit the necessary information to the intelligence server 200 in response to the request.

According to an embodiment, the client module 131 may transmit information resultant from executing the plurality of operations according to the plan to the intelligence server 200. The intelligence server 200 may identify that the received speech input has been properly processed using the result information.

According to an embodiment, the client module 131 may include a speech recognition module. According to an embodiment, the client module 131 may recognize the speech input to perform a limited function via the speech recognition module. For example, the client module 131 may perform an intelligence app to process the speech input to perform organic operations via a designated input (e.g., Wake up!).

According to an embodiment, the intelligence server 200 may receive information related to the user speech input from the user terminal 101 via a communication network. According to an embodiment, the intelligence server 200 may convert the data related to the received speech input into text data. According to an embodiment, the intelligence server 200 may generate a plan for performing the task corresponding to the user speech input based on the text data.

According to an embodiment, the plan may be generated by an artificial intelligence (AI) system. The AI system may be a rule-based system or a neural network-based system (e.g., feedforward neural network (FNN)) or recurrent neutral network (RNN)). The AI system may be a combination thereof or a system different therefrom. According to an embodiment, the plan may be selected from a set of pre-defined plans or created in real-time in response to a user request. For example, the AI system may select at least one plan from among a plurality of pre-defined plans.

According to an embodiment, the intelligence server 200 may transmit the result according to the generated plan to the user terminal 101 or transmit the generated plan to the user terminal 101. According to an embodiment, the user terminal 101 may display the result according to the plan on the display. According to an embodiment, the user terminal 101 may display the result of execution of the operation according to the plan on the display.

According to an embodiment, the intelligence server 200 may include a front end 210, a natural language platform 220, a capsule database (DB) 230, an execution engine 240, an end user interface 250, a management platform 260, a big data platform 270, and/or an analytic platform 280.

According to an embodiment, the front end 210 may include various circuitry and receive the speech input from the user terminal 101. The front end 210 may receive a response corresponding to the speech input.

According to an embodiment, the natural language platform 220 may include an various software modules (e.g., including various executable program instructions) including, for example, automatic speech recognition module (ASR module) 221, a natural language understanding module (NLU module) 223, a planner module 225, a natural language generator module (NLG module) 227, and/or a text to speech module (TTS module) 229.

According to an embodiment, the ASR module 221 may convert the user input received from the user terminal 101 into text data. According to an embodiment, the NLU module 223 may grasp the user's intent using the text data of the speech input. For example, the NLU module 223 may perform syntactic analysis or semantic analysis to grasp the user's intent. According to an embodiment, the NLU module 223 may grasp the meaning of a word extracted from the speech input using linguistic features (e.g., syntactic elements) of morphemes or phrases, match the grasped meaning of the word to the intent, and determine the user's intent.

According to an embodiment, the planner module 225 may generate a plan using the parameter and intent determined by the NLU module 223. According to an embodiment, the planner module 225 may determine a plurality of domains necessary to perform a task based on the determined intent. The planner module 225 may determine the plurality of operations included in the plurality of domains determined based on the intent. According to an embodiment, the planner module 225 may determine parameters necessary to execute the plurality of determined operations or resultant values output by execution of the plurality of operations. The parameters and resultant values may be defined in a designated format (or class) of concept. Thus, the plan may include the plurality of operations determined by the user's intent and a plurality of concepts. The planner module 225 may stepwise (or hierarchically) determine the relationship between the plurality of operations and the plurality of concepts. For example, the planner module 225 may determine the order of execution of the plurality of operations determined based on the user's intent based on the plurality of concepts. In other words, the planner module 225 may determine the order of execution of the plurality of operations based on the result output by execution of the plurality of operations and the parameters necessary to execute the plurality of operations. Thus, the planner module 225 may generate a plan that contains association information (e.g., ontology) between the plurality of operations and the plurality of concepts. A plan may be generated using information stored in the capsule DB 230 that stores a set of concept-operation relationships.

According to an embodiment, the NLG module 227 may convert designated information into a text type. The text-type information may be in the form of a natural language utterance. According to an embodiment, the TTS module 229 may convert text-type information into speech-type information.

According to an embodiment, all or some of the functions of the natural language platform 220 may also be implemented in the user terminal 101.

The capsule DB 230 may store information about the relationship between the plurality of concepts and operations corresponding to the plurality of domains. According to an embodiment, the capsule may include a plurality of concept objects (or concept information) and a plurality of action objects (or action information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry storing strategy information necessary to determine the plan corresponding to the speech input. The strategy information may include reference information for determining one plan if there are a plurality of plans corresponding to the speech input. According to an embodiment, the capsule DB 230 may include a follow up registry storing follow up information to propose a subsequent action to the user in a designated context. The subsequent action may include, e.g., a subsequent utterance. According to an embodiment, the capsule DB 230 may include a layout registry storing layout information about the information output via the user terminal 101. According to an embodiment, the capsule DB 230 may include a vocabulary registry storing vocabulary information included in capsule information. According to an embodiment, the capsule DB 230 may include a dialog registry storing dialog (or interaction) information with the user. The capsule DB 230 may update the stored object via a developer tool. The developer tool may include a function editor for updating, e.g., the action object or concept object. The developer tool may include a vocabulary editor for updating the vocabulary. The developer tool may include a strategy editor to generate and register a strategy to determine a plan. The developer tool may include a dialog editor to generate a dialog with the user. The developer tool may include a follow up editor capable of activating a subsequent goal and editing a subsequent utterance to provide a hint. The subsequent goal may be determined based on the current goal, the user's preference, or environmental conditions. According to an embodiment, the capsule DB 230 may also be implemented in the user terminal 101.

According to an embodiment, the execution engine 240 may produce a result using the generated plan. The end user interface 250 may transmit the produced result to the user terminal 101. Thus, the user terminal 101 may receive the result and provide the received result to the user. According to an embodiment, the management platform 260 may manage information used in the intelligence server 200. According to an embodiment, the big data platform 270 may gather user data. According to an embodiment, the analytic platform 280 may manage the quality of service (QoS) of the intelligence server 200. For example, the analytic platform 280 may manage the components and processing speed (or efficiency) of the intelligence server 200.

According to an embodiment, the service server 300 may provide a designated service (e.g., food ordering or hotel booking) to the user terminal 101. According to an embodiment, the service server 300 may be a server operated by a third party. According to an embodiment, the service server 300 may provide information for generating the plan corresponding to the received speech input to the intelligence server 200. The provided information may be stored in the capsule DB 230. The service server 300 may provide result information according to the plan to the intelligence server 200.

In the above-described integrated intelligence system, the user terminal 101 may provide various intelligent services to the user in response to user inputs. The user inputs may include, e.g., inputs using physical buttons, touch inputs, or speech inputs.

According to an embodiment, the user terminal 101 may provide a speech recognition service via an intelligence app (or speech recognition app) stored therein. In this case, for example, the user terminal 101 may recognize the user utterance or speech input received via the microphone and provide the service corresponding to the recognized speech input to the user.

According to an embodiment, the user terminal 101 may perform a designated operation, alone or together with the intelligence server and/or service server, based on the received speech input. For example, the user terminal 101 may execute the app corresponding to the received speech input and perform a designated operation via the executed app.

According to an embodiment, when the user terminal 101, together with the intelligence server 200 and/or service server, provides the service, the user terminal may detect a user utterance using the microphone 150 and generate a signal (or speech data) corresponding to the detected user utterance. The user terminal may transmit the speech data to the intelligence server 200 via the communication module 190.

According to an embodiment, in response to the speech input received from the user terminal 101, the intelligence server 200 may generate a plan for performing the task corresponding to the speech input or the result of the operation performed according to the plan. The plan may include a plurality of actions for performing the task corresponding to the user's speech input and a plurality of concepts related to the plurality of actions. The concept may be one defining parameters input upon execution of the plurality of actions or one defining the resultant value output by execution of the plurality of actions. The plan may include association information between the plurality of actions and the plurality of concepts.

According to an embodiment, the user terminal 101 may receive the response via the communication module 190. The user terminal 101 may output the speech signal generated inside the user terminal 101 to the outside using the speaker 155 or may output the image generated inside the user terminal 101 to the outside using the display 160.

Figure 3:
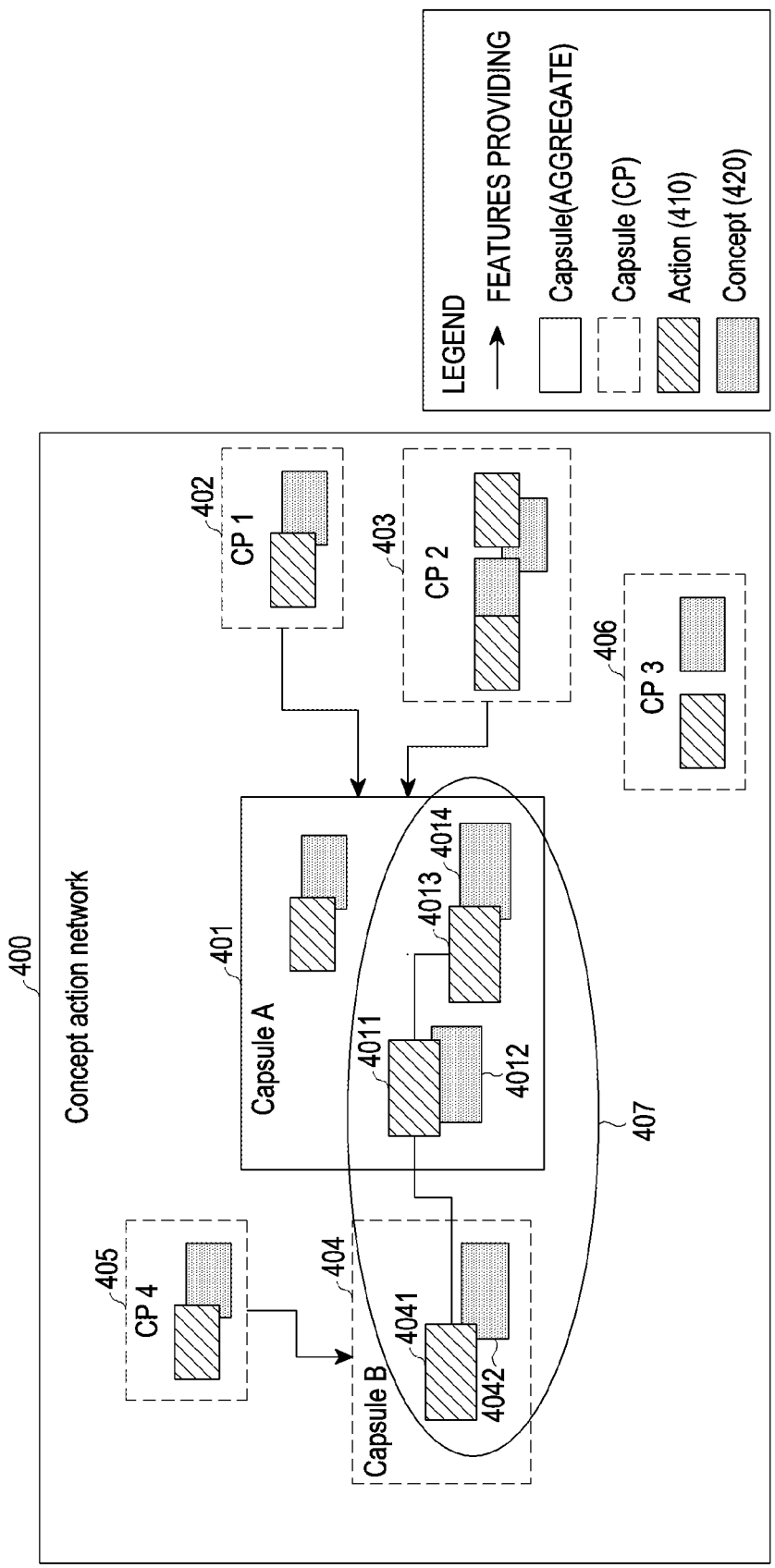
FIG. 3 is a diagram illustrating an example in which information for the relationship between concept and action is stored in a database according to various embodiments.

FIG. 3 is a diagram illustrating an example in which information for the relationship between concept and action is stored in a database according to various embodiments.

A capsule database (e.g., the capsule database 230) of the intelligence server 200 may store capsules in the form of a concept action network (CAN). The capsule database may store an operation for processing a task corresponding to the user's speech input and a parameter necessary for the operation in the form of the CAN.

The capsule database according to an embodiment may store a plurality of capsules (capsule (A) 401 and capsule (B) 404) respectively corresponding to a plurality of domains (e.g., applications). According to an embodiment, one capsule (e.g., capsule (A) 401) may correspond to one domain (e.g., location (geo), application). Further, one capsule may correspond to at least one service provider (e.g., CP 1 402, CP 2 403, CP 4 405 and/or CP 3 406) for performing a function for a domain related to the capsule. According to an embodiment, one capsule may include at least one or more operations 410 and at least one or more concepts 420 for performing a designated function.

The natural language platform 220 may generate a plan for performing a task corresponding to the received speech input using a capsule stored in the capsule database. For example, the planner module 225 of the natural language platform may generate a plan using a capsule stored in the capsule database. For example, a plan 407 may be generated using operations 4011 and 4013 and concepts 4012 and 4014 of capsule A 401 and an operation 4041 and concept 4042 of capsule B 404.

Figure 4:
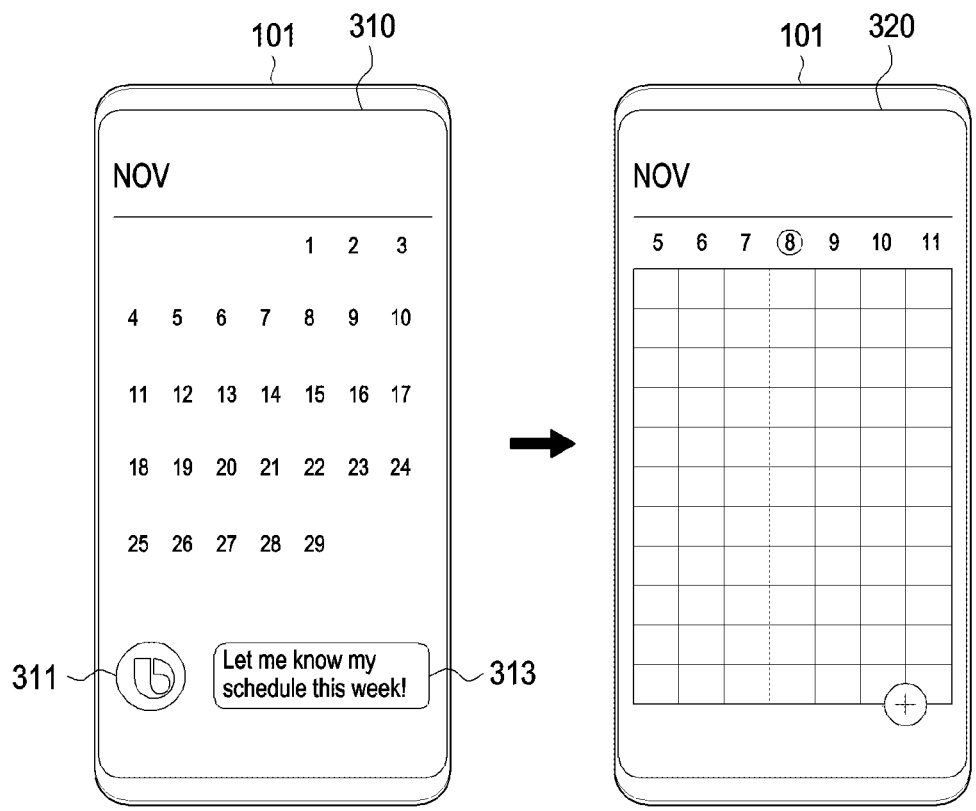
FIG. 4 is a diagram illustrating a user terminal displaying a screen for processing a speech input received through an intelligent app according to various embodiments.

FIG. 4 is a diagram illustrating a screen in which a UE processes a speech input received through an intelligent app according to various embodiments.

The user terminal 101 may execute an intelligent app to process user inputs through the intelligence server 200.

According to an embodiment, upon recognizing a designated speech input (e.g., a wakeup) or receiving an input through a hardware key (e.g., a dedicated hardware key) on a screen 310, the user terminal 101 may execute the intelligent app to process the speech input. The user terminal 101 may, e.g., execute the intelligent app, with a scheduler app running. According to an embodiment, the user terminal 101 may display an object (e.g., an icon) 311 corresponding to the intelligent app on the display 140. According to an embodiment, the user terminal 101 may receive a speech input by a user utterance. For example, the user terminal 101 may receive a speech input saying, "Let me know my schedule this week!". According to an embodiment, the user terminal 101 may display a user interface (UI) 313 (e.g., an input window) of the intelligent app displaying the text data of the received speech input on the display.

According to an embodiment, on a screen 320, the user terminal 101 may display a result corresponding to the received speech input on the display. For example, the user terminal 101 may receive the plan corresponding to the received user input, and display a 'this week's schedule' on the display according to the plan.

Figure 5:
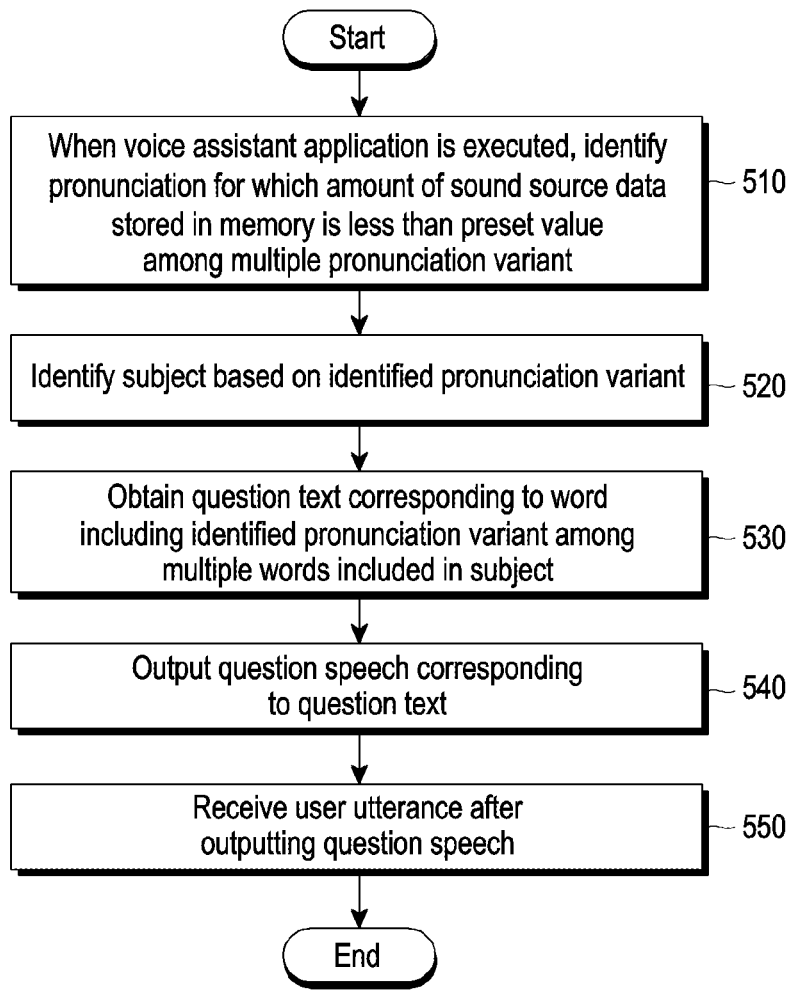
FIG. 5 is a flowchart illustrating an example operation for gathering user utterances by an electronic device according to various embodiments.

FIG. 5 is a flowchart illustrating an example operation for gathering user utterances by an electronic device according to various embodiments.

According to an embodiment, referring to FIG. 5, when a voice assistant application runs, the electronic device (e.g., the electronic device 101 of FIG. 1 or the processor 120) may identify pronunciation variants for which the amount of sound source data stored in the memory (e.g., the memory 130 of FIG. 1) is less than a preset (e.g., specified) value among a plurality of pronunciation variants in operation 510. The amount of sound source data per pronunciation variant is described in greater detail below with reference to FIG. 7B.

According to an embodiment, pronunciation variant may refer, for example, to a sequence of minimum speech units, e.g., phonemes, when a word or a sentence is implemented in speech.

According to an embodiment, when the user's question speech is received after the voice assistant application is executed, the electronic device may obtain answer text corresponding to the question speech and identify pronunciation variants, for which the amount of sound source data stored in the memory is less than the present value, or insufficient pronunciation variants, among the plurality of pronunciation variants included in the answer text. The answer data obtained from the user is described in greater detail below with reference to FIG. 7A, and the amount of sound source data for each pronunciation variant is described in greater detail below with reference to FIG. 7B.

According to an embodiment, in operation 520, the electronic device may identify a subject based on the identified pronunciation variant. For example, when at least one pronunciation variant for which the amount of sound source data stored is less than the preset value is identified, the electronic device may determine to gather user utterances for the at least one identified pronunciation variant and identify the subject of the question to induce a user utterance.

For example, the electronic device may identify a subject having most words including the identified pronunciation variant among a plurality of subjects. According to an embodiment, at least one word may be associated in the form of a list for each of the plurality of subjects, and per-subject word lists may be stored in the memory or received from an external server through a communication module (e.g., the communication module 190 of FIG. 1). According to an embodiment, per-subject word lists are described in greater detail below with reference to FIG. 8A.

According to an embodiment, the electronic device may identify a plurality of words including pronunciation variants for which the amount of sound source data stored is insufficient, using at least one of per-word pronunciation variant lists or per-pronunciation variant word lists stored in the memory and identify the subject that includes most words as identified, based on the per-subject word lists.

According to an embodiment, per-word pronunciation variant lists are described in greater detail below with reference to FIG. 9A, and per-pronunciation variant word lists are described in greater detail below with reference to FIG. 9B.

According to an embodiment, the electronic device may identify the subject including the insufficient pronunciation variant further considering the subject of the conversation with the user.

For example, when the user's question speech is received after the voice assistant application runs, the electronic device may obtain answer text corresponding to the question speech and identify the subject of the question to induce the user's utterance further considering the conversation subject of the answer text and the question speech. According to an embodiment, in a case where the electronic device obtains answer text corresponding to the user's question, since the subject is identified via a predictor module (e.g., the predictor module 630 of FIG. 6) while obtaining the answer text, the electronic device may identify the subject identified while obtaining the answer text as the conversation subject.

In an embodiment, when the user's speech is input after the voice assistant application outputs a question speech, the electronic device may analyze the user's speech to thereby obtain answer data and identify the subject of the question for inducing the user's utterance further considering the subject of the answer data. For example, the electronic device may identify the subject of a conversation with the user based on Equation (1) below.

$$\text{Probability of subject } x = (\text{number of words in subject } x \text{ in the answer data})/\Sigma(\text{Number of words in subject } i \text{ in the answer data}) \quad \text{Equation (1)}$$

For example, subject i is a variable from 1 to n individually corresponding to n subjects. For this reason, even when the words included in the answer data are included in a plurality of subjects, accurate subject prediction may be possible. The result of predicting the subject based on the answer data obtained by the user's utterance is described in greater detail below with reference to FIG. 8B.

According to an embodiment, in operation 530, the electronic device may obtain question text corresponding to the word including the identified pronunciation variant among the plurality of words included in the subject. For example, the electronic device may obtain the question text corresponding to a word including a pronunciation variant for which the amount of sound source data stored is insufficient among the plurality of words included in the identified subject.

According to an embodiment, the electronic device may identify the word for which the ratio of the number of pronunciation variants for which the amount of sound source data is insufficient to the total number of the pronunciation variants of the word among the plurality of words included in the identified subject. For example, the electronic device may assign word selection scores based on Equation (2)

below for the plurality of words included in the identified subject and identify the word that has the largest word selection score.

Word selection score of word $s$ for pronunciation variant $x$=Number of pronunciation variants $x$ in word $s$/Total number of pronunciation variants in word $s$               Equation (2)

According to an embodiment, the electronic device may identify the word including the insufficient pronunciation variant (e.g., pronunciation variant x in Equation (2)) in the largest ratio and obtain the question text corresponding to the identified word in a per-word question list. For example, the per-word question list may be a list in which each word matches a question for leading to a user utterance, and the per-word question list may be received in the memory or received from an external server. According to an embodiment, the per-word question list is described in greater detail below with reference to FIG. 10.

According to an embodiment, in operation 540, the electronic device may output a question speech corresponding to the question text.

According to an embodiment, the electronic device may output the question speech corresponding to the question text through a speaker (e.g., the sound output module 155 of FIG. 1) included in the electronic device. For example, the electronic device may convert the question text into a question speech using a TTS module (e.g., the TTS module 229 of FIG. 2) trained based on the P-TTS module and output the question speech through the speaker.

According to an embodiment, upon outputting the question speech through an external speaker device (e.g., the electronic device 102 or 104 (e.g., an earphone) of FIG. 1) connected with the electronic device, the electronic device may transmit the question speech to the external speaker device through the communication module (e.g., the communication module 190 of FIG. 1) so that the external speaker device outputs the question speech.

According to an embodiment, when the electronic device is a server connected with an external electronic device (e.g., a smartphone), the electronic device may transmit the question speech to the external electronic device through the communication module so that the external electronic device outputs the question speech.

According to an embodiment, in operation 550, the electronic device may receive a user utterance after outputting the question speech.

According to an embodiment, after outputting the question speech, the electronic device may receive the user utterance through the microphone (e.g., the input module 150 of FIG. 1) included in the electronic device.

According to an embodiment, when the user utterance is received through an external microphone device (e.g., the electronic device 102 or 104 of FIG. 1) (e.g., an earphone) connected with the electronic device, the electronic device may receive the user utterance received by the external microphone device, through the communication module (e.g., the communication module 190 of FIG. 1).

According to an embodiment, when the electronic device is a server connected with an external electronic device (e.g., a smartphone), the electronic device may receive the user utterance received by the external electronic device, through the communication module.

According to an embodiment, the electronic device may recognize the received user utterance through an ASR module (e.g., the automatic speech recognition module 221 of FIG. 2 or the ASR module 610 of FIG. 6), obtain text corresponding to the user utterance, and store a pair of the text and the sound. According to an embodiment, operations after receiving the user utterance for training the P-TTS module are described below with reference to FIG. 6.

Figure 6:
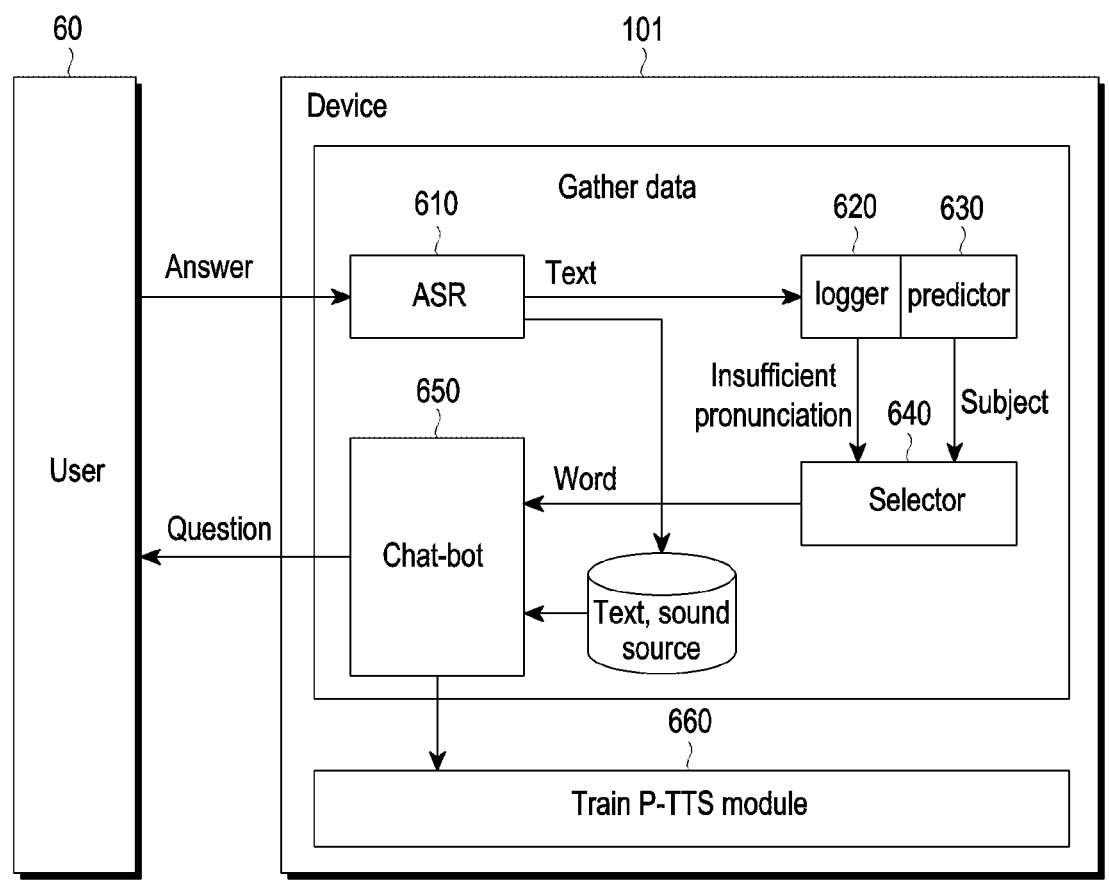
FIG. 6 is a diagram illustrating an example operation for training a P-TTS module by an electronic device according to various embodiments.

FIG. 6 is a diagram illustrating an example operation for training a P-TTS module by an electronic device according to various embodiments.

According to an embodiment, when the electronic device 101 (e.g., the electronic device 101 or the processor 120 of FIG. 1) receives an utterance of the user 60, the electronic device 101 may obtain pronunciation variants and sound source data for the received user utterance.

For example, the electronic device 101 may obtain text for the received utterance through the ASR module 610 (e.g., the processor 120 of FIG. 1 or the automatic speech recognition module 221 of FIG. 2).

According to an embodiment, the electronic device 101 may obtain a plurality of pronunciation variants included in the text obtained from the ASR module 610.

According to an embodiment, the electronic device 101 may map the sound source data, which is based on the received user utterance, and the text obtained through the ASR module 610 and store the pair in the memory (e.g., the memory 130 of FIG. 1). According to an embodiment, the electronic device 101 may map sound source data for each of the plurality of pronunciation variants included in the obtained text and store the pair in the memory.

According to an embodiment, the stored sound source data-text pair may be used as an input to the P-TTS module (e.g., the processor 120 of FIG. 1 or the TTS module 229 of FIG. 2).

According to an embodiment, the electronic device 101 may identify a pronunciation variant for which the amount of sound source data stored in the memory is less than a preset value among a plurality of pronunciation variants through a logger module 620 (e.g., the processor 120 of FIG. 1). According to an embodiment, when the pronunciation variant for which the amount of sound source data is less than the preset (e.g., specified) value is identified, the electronic device 101 may determine to provide a question speech for inducing a user utterance from the identified pronunciation variant and transfer information about the pronunciation variant identified through the logger module 620 to a selector module 640.

In an embodiment, the electronic device 101 may extract the pronunciation variant included in the user utterance using the logger module 620. For example, answer data gathered by the user utterance is described in greater detail below with reference to FIG. 7A.

According to an embodiment, the electronic device 101 may predict the conversation subject from the user utterance using a predictor module 630 (e.g., the processor 120 of FIG. 1 or the NLU module 223 of FIG. 2) and transfer information about the predicted conversation subject to the selector module 640. According to an embodiment, the predictor module 630 may obtain a result of prediction as illustrated in FIG. 8B using per-subject word lists as illustrated in FIG. 8A. For example, the predictor module 630 may predict the probability of at least one subject included in the user utterance based on Equation (1) described above.

According to an embodiment, the electronic device 101 may identify a word including an insufficient pronunciation variant through the selector module 640 (e.g., the processor 120 of FIG. 1). For example, the selector module 640 may identify the subject that includes most words having the insufficient, based on the information about the insufficient pronunciation variant received from the logger module 620. For example, the selector module 620 may identify the subject that includes most words having the insufficient pronunciation variant based on the per-subject word lists as illustrated in FIG. 8A.

According to an embodiment, the selector module 640 may identify the subject the insufficient pronunciation variant further considering the conversation subject received from the predictor module 630.

According to an embodiment, the selector module 640 may identify a word to induce a user utterance based on the per-pronunciation variant word lists or per-word pronunciation variant lists for the plurality of words included in the identified subject. For example, the selector module 640 may identify that a word having the insufficient pronunciation variant in a high proportion among the plurality of words included in the per-pronunciation variant word lists or the per-word pronunciation variant lists, as a word for inducing a user utterance, based on Equation (2) above. According to an embodiment, the selector module 640 may transfer information about the identified word to a chat-bot module 650. According to an embodiment, per-word pronunciation variant lists are described in greater detail below with reference to FIG. 9A, and per-pronunciation variant word lists are described in greater detail below with reference to FIG. 9B.

According to an embodiment, the electronic device 101 may obtain question text corresponding to the identified word through the chat-bot module 650 (e.g., the processor 120 of FIG. 1). For example, the chat-bot module 650 may obtain the question text corresponding to the word received from the selector module 640, from per-word question lists. According to an embodiment, the per-word question list is described in greater detail below with reference to FIG. 10.

According to an embodiment, the chat-bot module 650 may obtain the question speech corresponding to the question text through the P-TTS module or the TTS module and provide the question speech to the user 60.

According to an embodiment, the chat-bot module 650 may determine whether to repeat the question speech output operation further considering the obtained sound source data and the pronunciation variant obtained from the user utterance received after providing the question speech.

For example, when a pronunciation variant for which the amount of sound source data is less than a preset value is identified upon further considering the obtained pronunciation variant and the obtained sound source data, the chat-bot module 650 may repeat the operations of identifying a subject, obtaining question text, and outputting question speech. Thus, it is possible to obtain sound source data per pronunciation variant from the user utterance.

According to an embodiment, when no pronunciation variant for which the amount of sound source data is less than the preset value is identified upon further considering the obtained pronunciation variant and the obtained sound source data, the chat-bot module 650 may train (660) the P-TTS module based on the obtained pronunciation variant and the obtained sound source data. For example, when it is identified that the amount of sound source data for the insufficient pronunciation variant, which is gathered by receiving the user utterance according to the provision of the question speech, is not less than a preset value, the chat-bot module 650 stops providing the question speech and train the P-TTS module using the sound source data and pronunciation variant obtained according to the provision of the question speech.

Although operations performed after a user utterance is received have been described with reference to FIG. 6, according to an embodiment, the operations of the logger module 620, the selector module 640, and the chat-bot module 650, except for the operations of the ASR module 610 and the predictor module 630, may be performed after the voice assistant application runs and before a user utterance is received.

FIG. 7A is a chart illustrating example answer data gathered by a user's utterance according to various embodiments.

According to an embodiment, referring to FIG. 7A, an electronic device (e.g., the electronic device 101 or the processor 120 of FIG. 1) may output a question through a voice assistant application. For example, the electronic device may output a question, such as "What's your hobby?" as a speech or display it on a display (e.g., the display module 160 of FIG. 1).

According to an embodiment, the electronic device may receive answer data after outputting the question. For example, after outputting the question, the electronic device may receive a user utterance, such as answer 1 or answer 2 as illustrated in FIG. 7A.

FIG. 7B is a chart illustrating the amount of sound source data per pronunciation variant according to various embodiments.

According to an embodiment, referring to FIG. 7B, the electronic device may identify the amount of sound source data for each pronunciation variant stored in a memory (e.g., the memory 130 of FIG. 1). For example, the electronic device may identify the amount of sound source data for each pronunciation variant based on a reference amount of sound source data required to convert text into speech using the P-TTS module. According to an embodiment, as illustrated in FIG. 7B, the electronic device may identify the amount of sound source data for each pronunciation variant by ratio or by capacity.

According to an embodiment, the electronic device may analyze the user's answer data as illustrated in FIG. 7A to thereby obtain pronunciation variants and per-pronunciation variant sound source data, and the electronic device may update the per-pronunciation variant sound source data stored in the memory based on the obtained sound source data.

FIG. 8A is a chart illustrating an example word list for each subject according to various embodiments.

According to an embodiment, an electronic device (e.g., the electronic device 101 or the processor 120 of FIG. 1) may identify the subject that includes most words having an insufficient pronunciation variant based on the per-subject word lists as illustrated in FIG. 8A.

According to an embodiment, when obtaining user answer data, the electronic device may predict the subject of the user answer data using per-subject word lists. According to an embodiment, the result of subject prediction is described in greater detail below with reference to FIG. 8B.

According to an embodiment, the per-subject word lists may be stored in a memory (e.g., the memory 130 of FIG. 1) or received from an external server through a communication module (e.g., the communication module 190 of FIG. 1). The per-subject word list of FIG. 8A is merely an example for ease of description, and embodiments of the disclosure are not limited thereto.

FIG. 8B is a chart illustrating an example result of subject prediction by an electronic device according to various embodiments.

According to an embodiment, referring to FIG. 8B, an electronic device (e.g., the electronic device 101 or processor 120 of FIG. 1) may predict the subject of answer data obtained from the user, based on the per-subject word lists illustrated in FIG. 8A. For example, the electronic device may obtain the ratio between the sum of the numbers of words for the subjects included in the answer data and the number of words per subject, thereby predicting the subject. For example, referring to FIG. 8B, the electronic device may obtain the ratio between the sum of the numbers of words for the subjects and the number of words related to the subject "K-POP," such as "music-listening," "TVXQ," "song," or "BTS," and the ratio between the sum of the numbers of words for the subjects and the number of words related to the subject "history," such as "originally" or "nowadays," based on Equation (1) above and obtain a 72% probability that the subject of the answer data is "K-POP" and a 13% probability that the subject of the answer data is "history." The result of subject prediction illustrated in FIG. 8B is merely an example for ease of description, and embodiments of the disclosure are not limited thereto.

FIG. 9A is a chart illustrating per-word pronunciation variants according to various embodiments.

According to an embodiment, referring to FIG. 9A, per-word pronunciation variant lists are ones in which a plurality of pronunciation variants are mapped to each word and may be stored in a memory (e.g., the memory 130 of FIG. 1) or received from an external server through a communication module (e.g., the communication module 190 of FIG. 1). According to an embodiment, the per-word pronunciation variant lists may include a plurality of words included in one subject.

According to an embodiment, an electronic device (e.g., the electronic device 101 or processor 120 of FIG. 1 or the selector module 640 of FIG. 6) may identify the word including a pronunciation variant for which the amount of sound source data stored is insufficient, based on the per-word pronunciation variant lists of FIG. 9A.

For example, the electronic device may identify the word having the insufficient pronunciation variant in the largest proportion among the words included in the subject, based on the per-word pronunciation variant lists using Equation 2 above.

FIG. 9B is a chart illustrating per-pronunciation variant words according to various embodiments.

According to an embodiment, referring to FIG. 9A, per-pronunciation variant word lists are ones in which a plurality of words are mapped to each pronunciation variant and may be stored in a memory (e.g., the memory 130 of FIG. 1) or received from an external server through a communication module (e.g., the communication module 190 of FIG. 1). According to an embodiment, the per-pronunciation variant word lists may include a plurality of words included in one subject per pronunciation variant.

According to an embodiment, an electronic device (e.g., the electronic device 101 or processor 120 of FIG. 1 or the selector module 640 of FIG. 6) may identify the word including a pronunciation variant for which the amount of sound source data stored is insufficient, based on the per-pronunciation variant word lists of FIG. 9B.

For example, the electronic device may identify a plurality of words mapped to the insufficient pronunciation variant based on the per-pronunciation variant word lists and identify the word having the insufficient pronunciation variant in the largest proportion among the plurality of identified words using Equation (2) above.

FIG. 10 is a chart illustrating an example question list per word according to various embodiments.

According to an embodiment, referring to FIG. 10, per-word question lists may, for example, be ones in which at least one question text is mapped to each word and may be stored in a memory (e.g., the memory 130 of FIG. 1) or received from an external server through a communication module (e.g., the communication module 190 of FIG. 1). According to an embodiment, the per-word question lists may include at least one question text related to the subject per word.

According to an embodiment, an electronic device (e.g., the electronic device 101 or processor 120 of FIG. 1 or the chat-bot module 650 of FIG. 6) may identify question text for inducing a user utterance from the word having the pronunciation variant for which the amount of sound source data is insufficient, based on the per-word question lists as illustrated in FIG. 10.

Figure 11:
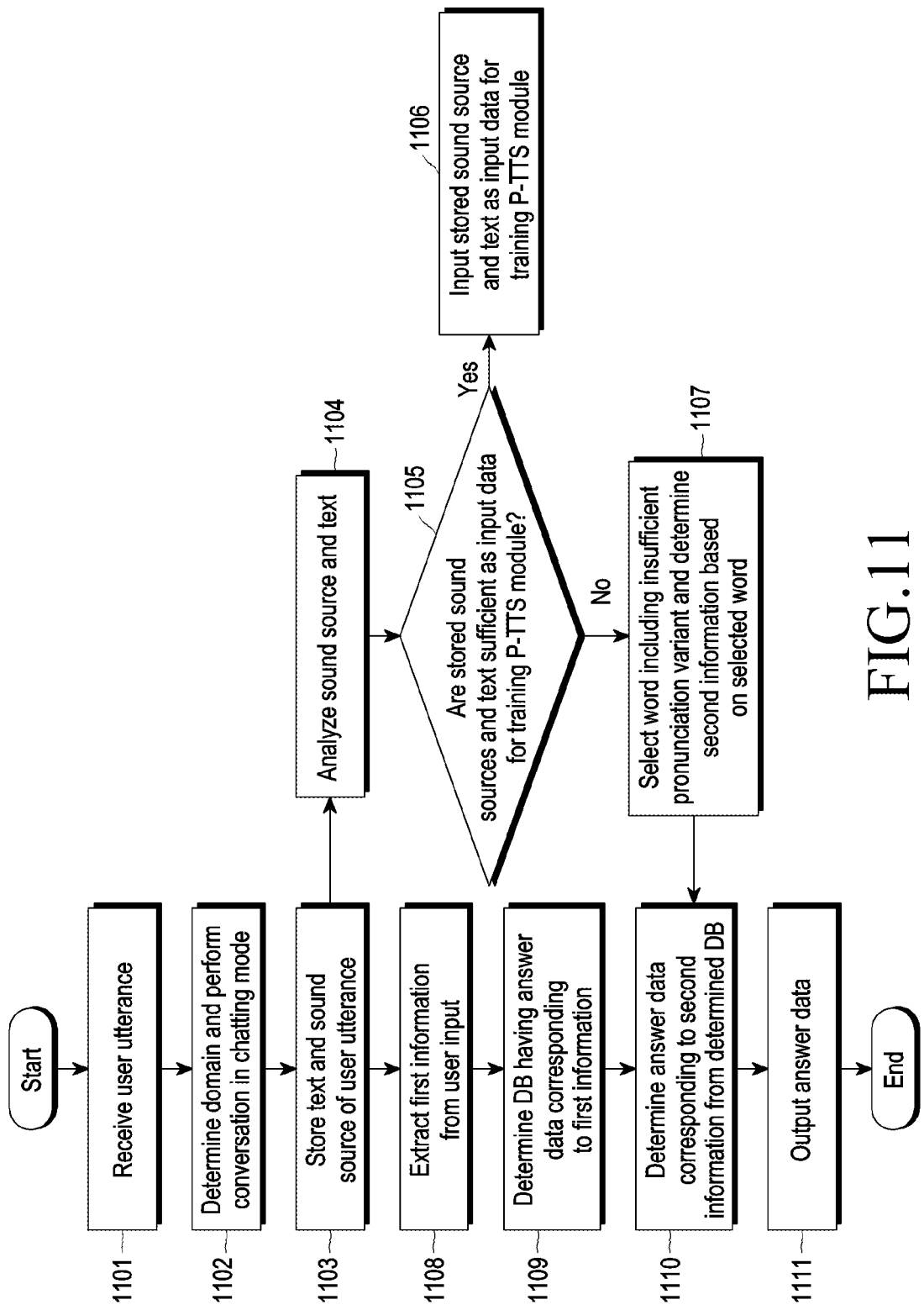
FIG. 11 is a flowchart illustrating an example operation for training a P-TTS module by an electronic device according to various embodiments.

FIG. 11 is a flowchart illustrating an example operation for training a P-TTS module by an electronic device according to various embodiments.

According to an embodiment, referring to FIG. 11, in operation 1101, an electronic device (e.g., the electronic device 101 or processor 120 of FIG. 1) may receive a user utterance. For example, when the user utterance "What do you want to do today?" the electronic device may determine a domain supporting a chatting mode and perform a conversation with the user in the chatting mode in operation 1102.

According to an embodiment, in operation 1103, the electronic device may store the text and sound source of the user utterance. For example, the electronic device may obtain the sound source through the input user utterance, obtain the text for the input user utterance through an ASR module (e.g., the ASR module 221 of FIG. 2 or the ASR module 610 of FIG. 6), and map and store the obtained sound source and text.

According to an embodiment, in operation 1104, the electronic device may start to analyze the stored sound source and text. For example, the electronic device may analyze whether the amount of sound source data per pronunciation variant is sufficient for P-TTS operation based on the stored sound sources and text. For example, when the amount of sound source data per pronunciation variant is sufficient, the electronic device may terminate the operation and, when the pronunciation variant for which the amount of sound source data is insufficient is identified, gather sound source data through user utterances and proceed with the operation to train the P-TTS module.

According to an embodiment, in operation 1105, the electronic device may analyze whether the stored sound sources and text are sufficient as input data for training the P-TTS module.

According to an embodiment, when the stored sound sources and text are sufficient as input data for training the P-TTS module (yes in operation 1105), the electronic device may input the stored sound sources and text as input data for training the P-TTS module in operation 1106.

According to an embodiment, unless the stored sound sources and text are sufficient as input data for training the P-TTS module (no in operation 1105), the electronic device may select a word including the insufficient pronunciation variant and determine second information based on the selected word in operation 1107. For example, the electronic device may determine that information about the subject including the selected word is the second information. The operation of identifying the subject related to the insufficient pronunciation variant and the operation of identifying the word have been described above with reference to FIGS. 5 and 6 and are thus may not be repeated below.

According to an embodiment, in operation 1108, the electronic device may extract first information from the user input. For example, the electronic device may extract the intent and parameter of the user utterance, as the first information, using an NLG module (e.g., the processor 120 of FIG. 1 or the NLU module 223 or NLG module 227 of FIG. 2).

According to an embodiment, in operation 1109, the electronic device may determine a database (DB) having answer data corresponding to the first information. For example, when the user utterance "What do you want to do today?" is input, the electronic device may determine a database having answer data for a routine conversation. According to an embodiment, the electronic device may obtain answer data, such as "Make your own bucket list this time," from the determined database.

According to an embodiment, in operation 1110, the electronic device may determine answer data corresponding to the second information from the determined database. For example, when a pronunciation variant for which the amount of sound source data is insufficient is identified, the electronic device may determine answer data corresponding to the second information from the determined database.

For example, when the user utters "I hate my mother," if sound sources and text for training the P-TTS module are sufficient, the electronic device may determine that "The closer, the more conversations are needed" is answer data from the database for routine conversations. In an embodiment, when the sound sources and text for training the P-TTS module are insufficient, the electronic device may obtain such question text as "Do you like BTS?" or "Which BTS member is your favorite?" for inducing a user utterance, e.g., "BTS," as answer data, based on the second information including the word "BTS" which includes an insufficient pronunciation variant from the database for routine conversations.

According to an embodiment, in operation 1111, the electronic device may output the obtained answer data. For example, the electronic device may output a speech corresponding to the answer data or display the question text.

According to an example embodiment, an electronic device (e.g., the electronic device 101 of FIG. 1) comprises: a memory (e.g., the memory 130 of FIG. 1) and at least one processor (e.g., the processor 120 of FIG. 1) operatively connected with the memory. The at least one processor may be configured to: in response to a voice assistant application being executed, identify a pronunciation variant for which an amount of sound source data stored in the memory is less than a specified value among a plurality of pronunciation variants, identify a subject based on the identified pronunciation variant, obtain a question text corresponding to a word including the identified pronunciation variant among a plurality of words included in the subject, output a question speech corresponding to the question text, and receive an utterance after outputting the question speech.

According to an example embodiment, the at least one processor may be configured to identify a subject including most words including the identified pronunciation variant.

According to an example embodiment, the at least one processor may be configured to: in response to receiving the question speech utterance after the voice assistant application is executed, obtain answer text corresponding to the question speech utterance and identify the subject further considering a conversation subject of the answer text and the question speech utterance.

According to an example embodiment, the at least one processor may be configured to: in response to receiving a question speech utterance after the voice assistant application is executed, obtain answer text corresponding to the question speech utterance, and identify a pronunciation variant for which the amount of sound source data stored in the memory is less than a specified value among a plurality of pronunciation variants included in the answer text.

According to an example embodiment, the at least one processor may be configured to: identify a word for which a ratio of the identified pronunciation variant to all pronunciation variants among a plurality of words included in the identified subject and obtain a question text corresponding to the identified word from per-word question lists for the plurality of words.

According to an example embodiment, the at least one processor may be configured to: obtain a pronunciation variant and sound source data for the received utterance and repeat the identifying of the subject, the obtaining of the question text, and the outputting the question speech in response to the amount of sound source data for the identified pronunciation variant among the obtained sound source data being less than an amount of sound source data set to train a personalized text-to-speech (P-TTS) module.

According to an example embodiment, the at least one processor may be configured to: train the P-TTS module based on the obtained pronunciation variant and the obtained sound source data in response to the amount of sound source data for the identified pronunciation variant among the obtained sound source data being not less than the set amount of sound source data.

According to an example embodiment, the electronic device may further comprise: a microphone (e.g., the input module 150 of FIG. 1) and a speaker (e.g., the sound output module 155 of FIG. 1). The at least one processor may be configured to: output the question speech through the speaker and receive the utterance through the microphone.

According to an example embodiment, the electronic device may further comprise: a communication module (e.g., the communication module 190 of FIG. 1) comprising communication circuitry. The at least one processor may be configured to: transmit the question speech to an external electronic device through the communication module and receive the utterance from the external electronic device through the communication module.

According to an example embodiment, the electronic device may include a server configured to communicate with the external electronic device.

According to an example embodiment, a method of controlling an electronic device comprises, in response to a voice assistant application being executed: identifying a pronunciation variant for which an amount of sound source data stored in a memory is less than a specified value among a plurality of pronunciation variants, identifying a subject based on the identified pronunciation variant, obtaining a question text corresponding to a word including the identified pronunciation variant among a plurality of words included in the subject, outputting a question speech corresponding to the question text, and receiving an utterance after outputting the question speech.

According to an example embodiment, identifying the subject may include identifying a subject including most words including the identified pronunciation variant.

According to an example embodiment, identifying the subject may include, in response to receiving a question speech utterance after the voice assistant application is executed, obtaining answer text corresponding to the question speech utterance and identifying the subject further considering a conversation subject of the answer text and the question speech utterance.

According to an example embodiment, identifying the pronunciation variant may include, in response to receiving the question speech utterance after the voice assistant application is executed, obtaining answer text corresponding to the question speech utterance and identifying a pronunciation variant for which the amount of sound source data stored in the memory is less than a specified value among a plurality of pronunciation variants included in the answer text.

According to an example embodiment, obtaining the question text may include: identifying a word for which a ratio of the identified pronunciation variant to all pronunciation variants among a plurality of words included in the identified subject and obtaining a question text corresponding to the identified word from per-word question lists for the plurality of words.

According to an example embodiment, the method may further comprise: obtaining a pronunciation variant and sound source data for the received utterance and repeating the identifying of the subject, the obtaining of the question text, and the outputting the question speech in response to the amount of sound source data for the identified pronunciation variant among the obtained sound source data being less than an amount of sound source data set to train a personalized text-to-speech (P-TTS) module.

According to an example embodiment, the method may further comprise: training the P-TTS module based on the obtained pronunciation variant and the obtained sound source data in response to the amount of sound source data for the identified pronunciation variant among the obtained sound source data being not less than the set amount of sound source data.

According to an example embodiment, outputting the question speech may include outputting the question speech through a speaker of the electronic device, and receiving the utterance may include receiving the utterance through a microphone of the electronic device.

According to an example embodiment, outputting the question speech may include transmitting the question speech to an external electronic device through a communication module of the electronic device, and receiving the utterance may include receiving the utterance from the external electronic device through the communication module.

According to an example embodiment, the electronic device may include a server configured to communicate with the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device, comprising:
   at least one processor, and
   memory storing instructions that, when executed by the at least one processor, cause the electronic device to:
   in response to a voice assistant application being executed, identify a pronunciation variant for which an amount of sound source data stored in the memory is less than a specified value among a plurality of pronunciation variants;
   identify a subject based on the identified pronunciation variant;
   obtain a question text corresponding to a word including the identified pronunciation variant among a plurality of words included in the subject;
   output a question speech corresponding to the question text; and
   receive an utterance after outputting the question speech.

2. The electronic device of claim 1, wherein the instructions, when executed by the at least one processor, cause the electronic device to identify the subject including most words including the identified pronunciation variant.

3. The electronic device of claim 1, wherein the instructions, when executed by the at least one processor, cause the electronic device to:
   in response to receiving the question speech utterance after the voice assistant application is executed, obtain answer text corresponding to the question speech utterance; and
   identify the subject further based on a conversation subject of the answer text and the question speech utterance.

4. The electronic device of claim 1, wherein the instructions, when executed by the at least one processor, cause the electronic device to:
   in response to receiving the question speech utterance after the voice assistant application is executed, obtain answer text corresponding to the question speech utterance; and
   identify a pronunciation variant for which the amount of sound source data stored in the memory is less than a specified value among a plurality of pronunciation variants included in the answer text.

5. The electronic device of claim 1, wherein the instructions, when executed by the at least one processor, cause the electronic device to:
   identify a word for which a ratio of the identified pronunciation variant to all pronunciation variants among a plurality of words included in the identified subject; and
   obtain a question text corresponding to the identified word from per-word question lists for the plurality of words.

6. The electronic device of claim 1, wherein the instructions, when executed by the at least one processor, cause the electronic device to:
   obtain a pronunciation variant and sound source data for the received utterance; and
   repeat the identifying of the subject, the obtaining of the question text, and the outputting the question speech in response to the amount of sound source data for the identified pronunciation variant among the obtained sound source data being less than an amount of sound source data set to train a personalized text-to-speech (P-TTS) module.

7. The electronic device of claim 6, wherein the instructions, when executed by the at least one processor, cause the electronic device to: train the P-TTS module based on the obtained pronunciation variant and the obtained sound source data in response to the amount of sound source data for the identified pronunciation variant among the obtained sound source data being not less than the set amount of sound source data.

8. The electronic device of claim 1, further comprising:
   a microphone; and
   a speaker,
   wherein
   the instructions, when executed by the at least one processor, cause the electronic device to:
   output the question speech through the speaker; and
   receive the utterance through the microphone.

9. The electronic device of claim 1, further comprising:
   a communication module comprising communication circuitry, wherein
   the instructions, when executed by the at least one processor, cause the electronic device to:
   transmit the question speech to an external electronic device through the communication module; and
   receive the utterance from the external electronic device through the communication module.

10. The electronic device of claim 9, wherein the electronic device comprises a server configured to communicate with the external electronic device.

11. A method of controlling an electronic device, the method comprising:
    in response to a voice assistant application being executed, identifying a pronunciation variant for which an amount of sound source data stored in a memory is less than a specified value among a plurality of pronunciation variants;
    identifying a subject based on the identified pronunciation variant;
    obtaining a question text corresponding to a word including the identified pronunciation variant among a plurality of words included in the subject;
    outputting a question speech corresponding to the question text; and
    receiving a utterance after outputting the question speech.

12. The method of claim 11, wherein identifying the subject includes identifying the subject including most words including the identified pronunciation variant.

13. The method of claim 11, wherein identifying the subject includes:

in response to receiving the question speech utterance after the voice assistant application is executed, obtaining answer text corresponding to the question speech utterance; and identifying the subject further considering a conversation subject of the answer text and the question speech utterance.

14. The method of claim 11, wherein identifying the pronunciation variant includes:

in response to receiving the question speech utterance after the voice assistant application is executed, obtaining answer text corresponding to the question speech utterance; and identifying a pronunciation variant for which the amount of sound source data stored in the memory is less than a specified value among a plurality of pronunciation variants included in the answer text.

15. The method of claim 11, wherein obtaining the question text includes:

identifying a word for which a ratio of the identified pronunciation variant to all pronunciation variants among a plurality of words included in the identified subject; and obtaining a question text corresponding to the identified word from per-word question lists for the plurality of words.

16. The method of claim 11, further comprising:

obtaining a pronunciation and sound source data for the received utterance; and repeating the identifying of the subject, the obtaining of the question text, and the outputting the question speech when the amount of sound source data for the identified pronunciation among the obtained sound source data is less than an amount of sound source data set to train a personalized text-to-speech (P-TTS) module.

17. The method of claim 16, further comprising training the P-TTS module based on the obtained pronunciation and the obtained sound source data when the amount of sound source data for the identified pronunciation among the obtained sound source data is not less than the set amount of sound source data.

18. The method of claim 11, wherein outputting the question speech includes outputting the question speech through a speaker of the electronic device, wherein and receiving the user utterance includes receiving the utterance through a microphone of the electronic device.

19. The method of claim 11, wherein outputting the question speech includes transmitting the question speech to an external electronic device through a communication module of the electronic device, and wherein receiving the user utterance includes receiving the utterance from the external electronic device through the communication module.

20. One or more non-transitory computer-readable storage media storing computer-executable instructions that, when executed by at least one processor of an electronic device, cause the electronic device to perform operations, the operations comprising:

in response to a voice assistant application being executed, identifying a pronunciation variant for which an amount of sound source data stored in a memory is less than a specified value among a plurality of pronunciation variants;

identifying a subject based on the identified pronunciation variant;

obtaining a question text corresponding to a word including the identified pronunciation variant among a plurality of words included in the subject;

outputting a question speech corresponding to the question text; and receiving a utterance after outputting the question speech.

* * * * *